(12) United States Patent
Bertoldo et al.

(10) Patent No.: US 10,481,792 B2
(45) Date of Patent: Nov. 19, 2019

(54) SECURE AUTHENTICATED CONNECTED KEYBOARD

(71) Applicant: salesforce.com, inc., San Francisco, CA (US)

(72) Inventors: Greg Bertoldo, San Francisco, CA (US); Joseph Andolina, Castro Valley, CA (US); John Earle, San Francisco, CA (US); Justin Maguire, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/686,817

(22) Filed: Aug. 25, 2017

(65) Prior Publication Data

US 2019/0065044 A1  Feb. 28, 2019

(51) Int. Cl.
| | | |
|---|---|---|
| *G06F 3/0488* | (2013.01) | |
| *G06F 21/31* | (2013.01) | |
| *G06F 21/36* | (2013.01) | |
| *G06F 3/0482* | (2013.01) | |
| *G06Q 30/00* | (2012.01) | |
| *G06F 21/83* | (2013.01) | |
| *G06F 21/44* | (2013.01) | |

(52) U.S. Cl.
CPC ........ G06F 3/04886 (2013.01); G06F 21/316 (2013.01); G06F 21/36 (2013.01); *G06F 3/0482* (2013.01); *G06F 21/44* (2013.01); *G06F 21/83* (2013.01); *G06Q 30/01* (2013.01)

(58) Field of Classification Search
CPC ........ G06F 21/83; G06F 21/44; G06F 3/0482; G06F 3/04886
See application file for complete search history.

(56) References Cited

U.S. PATENT DOCUMENTS

| | | | | |
|---|---|---|---|---|
| 2011/0296507 A1* | 12/2011 | Khosrowshahi | ........ | G06F 17/24 726/7 |
| 2015/0277686 A1* | 10/2015 | LaForge | .................. | H04L 67/10 715/723 |
| 2017/0359695 A1* | 12/2017 | Aerts | ................... | G06F 3/04883 |
| 2018/0157409 A1* | 6/2018 | Jung | .................... | G06F 3/04883 |
| 2019/0065044 A1* | 2/2019 | Bertoldo | ............. | G06F 3/04886 |

* cited by examiner

*Primary Examiner* — David E Choi
(74) *Attorney, Agent, or Firm* — Sterne, Kessler, Goldstein & Fox P.L.L.C.

(57) ABSTRACT

Disclosed herein are system, method, and computer program product embodiments for sharing a record from another application without leaving a current application. An embodiment operates by receiving a request for a record in an application at a user interface of a connected keyboard. The embodiment accesses credentials in a credential database from the connected keyboard based on the request. The embodiment transmits the request for the record to the application from the connected keyboard based on the credentials. The embodiment receives the record from the application at the connected keyboard. The embodiment then outputs the record at the connected keyboard.

21 Claims, 4 Drawing Sheets

SECURE AUTHENTICATED CONNECTED KEYBOARD

BACKGROUND

A user who is trying collaborate with other users often has to break their workflow when sharing data. This is because the user may need to switch between different applications. For example, if a user is writing an email, and wants to share a customer relationship management (CRM) record, the user must open the corresponding CRM application and copy and paste the record into the email. This often further requires the user to log in to the CRM application prior to copying and pasting the record into the email. This is tedious, error prone, and potentially insecure.

In addition, the user may want to share a record (e.g., a CRM record) with other users who may not have access to an application that can open the record. This may reduce data sharing opportunities between the user and other users.

Thus, what is needed is a way for a user to quickly share a record from another application without leaving their current application.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for sharing a record from another application without leaving a current application.

Figure 1:
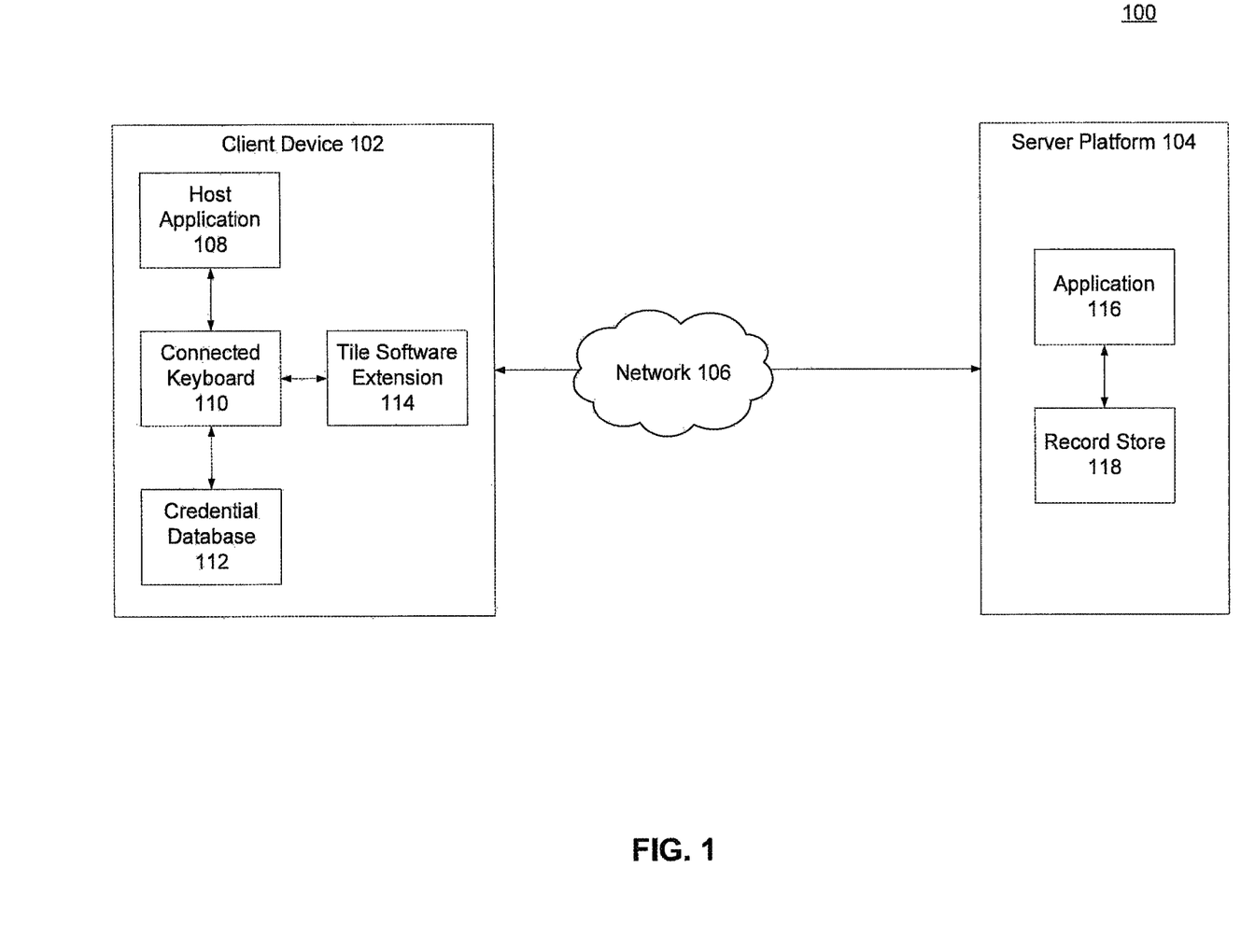
FIG. 1 is a block diagram of a secure authenticated connected keyboard system, according to some embodiments.

FIG. 1 is a block diagram of a secure authenticated connected keyboard system 100, according to some embodiments. Secure authenticated connected keyboard system 100 enables a user, via a virtual keyboard, to share data from another application with other users without breaking their workflow. This is possible because the virtual keyboard is often accessible to a user while they use an application. Secure authenticated connected keyboard system 100 enables a user to capture a record from another application and output the record into a current application without leaving the current application. Secure authenticated connected keyboard system 100 may output a text representation of the record so that other users can view the record.

Secure authenticated connected keyboard system 100 includes client device 102 connected to server platform 106 via network 106.

In some embodiments, client device 120 may be a desktop computer, laptop, tablet, smartphone, smartwatch, or other electronic device as would be appreciated by person of ordinary skill in the art.

In some embodiments, server platform 106 may be a server computer. In some other embodiments, server platform 106 may be a software platform for cloud computing. For example, server platform 106 may be Software as a Service (SaaS) cloud platform where a user subscribes to an application that they access via the Internet.

In some embodiments, network 106 may be any network or combination of networks including the Internet, a local area network (LAN), a wide area network (WAN), a wireless network, a cellular network, or various other types of networks as would be appreciated by a person of ordinary skill in the art.

In some embodiments, client device 102 includes a host application 108, a connected keyboard 110, and a credential database 112. Host application 108 may be a currently running and displayed application on client device 102. For example, host application 108 may be an email client currently running and displayed on client device 102.

In some embodiments, host application 108 may be a mobile app designed to run on smartphones, tablets, and various other types of mobile devices. In some other embodiments, host application 108 may be a web app designed to run inside a web browser. In some other embodiments, host application 108 may be a software application designed to run on a desktop computer, laptop computer, or other electronic device. As would be appreciated by a person of ordinary skill in the art, host application 108 may be another other type of software application.

In some embodiments, host application 108 may receive user input via a user interface of connected keyboard 110. The user interface of connected keyboard 110 may be a virtual keyboard. The user interface of connected keyboard 110 may be displayed on client device 102. Connected keyboard 110 may receive user input via a user tapping or finger-tracing the user interface of connected keyboard 110 (e.g., a virtual keyboard) using a finger, computer mouse, touchpad, or other input mechanism as would be appreciated by a person of ordinary skill in the art.

In some embodiments, host application 108 may display a user interface of connected keyboard 110 when host application 108 is ready to receive user input. For example, host application 108 may display the user interface of connected keyboard 112 when a user selects an input text box in host application 108.

In some embodiments, connected keyboard 110 may be implemented as a software extension for host application 108. In some embodiments, connected keyboard 110 may be implemented as an Apple Inc. iOS™ app extension, a Google Inc. Android™ extension, or a software extension for various other operating systems as would be appreciated by a person of ordinary skill in the art.

In some embodiments, connected keyboard 110 may respond to taps, gestures, or other input events from a user interface of connected keyboard 110 and output text at a text insertion point of a current text input object in host application 108. In some embodiments, connected keyboard 112 may also respond to taps, gestures, or other input events from a user interface of connected keyboard 110 and output an image at an insertion point of a current input object in host application 108.

In addition to inputting text or an image, a user may also want to share a record from application 116. Moreover, the user may want to capture the record from application 116 without leaving host application 108. The user may also want to output the captured record to host application 108 for further processing.

In some embodiments, application 116 at server 104 may be a software application containing one or more records that a user may wish to share with other users via host application 108. In some embodiments, application 116 may be a software application designed to run on a server computer, cloud computing platform, or other electronic device. In some other embodiments, application 116 may be a web application designed to be run through a web server.

In some embodiments, application 116 may store one or more records in record store 118. Record store 118 may be a database or other type of data store. A record may be an item or collection of data for application 116. For example, a record may be a customer relationship management (CRM) object for application 116. As would be appreciated by a person of ordinary skill in the art, a record may represent various other types of data.

In some embodiments, connected keyboard 110 may receive a request for a record, or list of records, in application 116 based on a user gesture at a user interface of connected keyboard 110. In some embodiments, the user interface of connected keyboard 110 may be virtual keyboard displayed at client device 102. In some embodiments, the user gesture may include tapping a special key on the user interface of connected keyboard 110. In some other embodiments, the user gesture may include tapping and hold a special key (e.g., a space bar) on the user interface of connected keyboard 110 for a predefined period of time. As would be appreciated by a person of ordinary skill in the art, the user gesture may be another type of input gesture.

In some embodiments, the user interface of connected keyboard 110 may display a menu of commands in response to the user gesture. As would be appreciated by a person of ordinary skill in the art, the user interface of connected keyboard 110 may display the menu of commands in various ways on client device 102. For example, in some embodiments, the user interface of connected keyboard 110 may display the menu of commands as an overlay menu on client device 102.

In some embodiments, the menu of commands may be divided between a search section and a records section. The search section may allow a user to search for records in application 116 matching a particular search criteria. The search section may allow a user to search for records in application 116 independent of record type (e.g., a CRM contact, account, or contract record). A user may input a search criteria in the search section. For example, the user may input the search criteria as a text string. In some other embodiments, the user may select a predefined search criteria. As would be appreciated by a person of ordinary skill in the art, connected keyboard 110 may include various predefined search criteria.

In some embodiments, the records section may allow a user to select a record from application 116. For example, the records sections may allow a user to select a CRM contact record. The records section may display a list of records for each record type. A user may sort the list of records based on various criteria including, but limited to, date created and most recently used.

In some embodiments, connected keyboard 110 may generate the menu of commands based on a state of host application 108. The state of host application 108 may include a currently displayed application screen, a configuration of host application 108, and various other characteristics host application 108 as would be appreciated by a person of ordinary skill in the art. In some embodiments, connected keyboard 110 may generate the menu of commands for the search section based on the state of host application 108. In some embodiments, connected keyboard 110 may generate the menu of commands for the records section based on the state of host application 108.

In some embodiments, connected keyboard 110 may generate the menu of commands based on a user context. The user context may include a previous user input, a role of the user, a location of the user, and various other characteristics of the user as would be appreciated by a person of ordinary skill in the art. In some embodiments, connected keyboard 110 may generate the menu of commands for the search section based on the user context. In some embodiments, connected keyboard 110 may generate the menu of commands for the records section based on the user context.

In some embodiments, connected keyboard 110 may generate a search request based on search criteria inputted by the user. Connected keyboard 110 may then transmit the search request to application 116.

In some embodiments, connected keyboard 110 may generate a request for a record based on user selection of a record in the records section. The request may include a record identifier that uniquely identifies the selected record in record store 118. Connected keyboard 112 may then transmit the request for the record to application 116.

In some embodiments, connected keyboard 110 may generate a request for a record based on user selection of a record in a list of records returned in response to a search request. The request may include a record identifier that uniquely identifies the selected record in record store 118. Connected keyboard 110 may then transmit the request for the record to application 116.

In some embodiments, connected keyboard 110 may transmit a search request or a request for a record to application 116 via network 106. In some embodiments, connected keyboard 112 may transmit the request over a Hypertext Transfer Protocol (HTTP) or HTTP Secure (HTTPS) connection between client device 102 and server platform 104.

In some embodiments, application 116 may process the request from connected keyboard 110. If the request is for a particular record, application 116 may retrieve the particular record from record store 118 based on the request. For example, application 116 may retrieve the particular record from record store 118 based on a unique record identifier stored in the request. If the request is a search request, application 116 may search record store 118 for records matching a search criteria in the search request. As would be appreciated by a person of ordinary skill in the art, application 116 may search record store 118 using various search functions and data structures.

In some embodiments, application 116 may transmit the requested record or list of records to connected keyboard 110. Connected keyboard 110 may receive the requested record, or list of records, from application 116 in JavaScript Object Notation (JSON), Extensible Markup Language (XML), or various other data formats.

In some embodiments, connected keyboard 110 may receive a list of records matching a search criteria. A user interface of connected keyboard 110 may display the list of records as a menu of commands. A user may select a record in the list of records. In response, connected keyboard 110 may request the selected record from application 116.

In some embodiments, a user may need to log in to application 116 in order to retrieve a record and interact with application 116. In some embodiments, connected keyboard 110 may enable a user to avoid leaving host application 108 when sharing data from application 116 by accessing login credentials for the user from credentials database 112.

In some embodiments, credential database 112 may be a database or various other type of data store on client device 102. Credential database 112 may store credentials such as usernames, passwords, encryption keys, certificates, and other data as would be appreciated by a person of ordinary skill in the art. Credential database 112 may be implemented as a secure area of client device 102. For example, in some embodiments, credential database 112 may be a secure enclave on client device 102.

In some embodiments, an operating system on client device 102 may control access to credential database 112. The operating system may provide an application programming interface (API) for reading and writing data securely to credential database 112. This ensures an application cannot access data in credential database 112 without explicit action by the user. In some embodiments, connected keyboard 110 may retrieve login credentials from credential database 112 using the API.

In some embodiments, connected keyboard 110 may access credential database 112 in response to a search request or a request for a record in application 116. This may occur when application 116 requires a login. For example, in some embodiments, connected keyboard 110 may retrieve login credentials for a current user from credential database 112 in order to log in to application 116 and issue a search request or a request for a record to application 116.

In some embodiments, connected keyboard 110 may include the login credentials in the search request or the request for the record in application 116. In some other embodiments, connected keyboard 110 may log in to application 116 using the login credentials of the current user from credential database 112. Connected keyboard 110 may then issue the search request or the request for the record to application 116.

In some embodiments, connected keyboard 110 may convert a record from application 116 to a text representation for output. This enables the record to be outputted to host application 108 as though the record was inputted directly by a user at the connected keyboard 110. This further enables a user to share the record via host application 108 with other users. This is true even if the other users do not have access to application 116. This is because the record is formatted as text. For example, connected keyboard 110 may convert a CRM contact record to a text string of field value pairs, e.g. "First Name: John, Last Name: Smith, Email: jsmith@domain.com." As would be appreciated by a person of ordinary skill in the art, connected keyboard 110 may represent a record using various text formats. Moreover, as would be appreciated by a person of ordinary skill in the art, different record types may have different text formats based on their record type.

In some embodiments, connected keyboard 110 may convert a record from application 116 to a text representation based on connected keyboard 110's knowledge of different record types in application 116. In some other embodiments, connected keyboard 110 may convert a record from application 116 to a text representation using a software extension installed for connected keyboard 110.

In some embodiments, connected keyboard 110 may generate a deep link to the record in application 116 for output to the host application 108. When selected by a user, the deep link may open the particular record directly in application 116 without additional steps or actions by the user. A deep link enables a user to share the record with other users. For example, a user can share the deep link with other users by sending it to the other users using host application 108.

In some embodiments, a deep link may be formatted as a uniform resource locator (URL). However, as would be appreciated by a person of ordinary skill in the art, a deep link may be implemented in other ways including, but limited to, a binary memory address. In some embodiments, a deep link may include parameters specific to application 116 that enable application 116 to open a particular record, e.g., a unique record identifier for the record. In some embodiments, a deep link may include parameters specific to application 116 that enable application 116 to reestablish the state of application 116 when the particular record was created or modified, e.g., a graphical user interface window arrangement.

In some embodiments, connected keyboard 110 may represent the record from application 116 as an image for output to host application 108. In some embodiments, the image may be bound to a deep link to the record in application 116. In some embodiments, the image may be a generic icon. In some other embodiments, the image may an icon specific to a type of the record, e.g., a generic person figure for a CRM contact.

In some embodiments, connected keyboard 110 may generate an image representation of content of the record in application 116. For example, in some embodiments, connected keyboard 110 may send a received record to tile software extension 114. Tile software extension 114 may be a software extension. For example, in some embodiments, tile software extension 114 may be implemented as an Apple Inc. iOS™ app extension, a Google Inc. Android™ extension, or a software extension for various other operating systems as would be appreciated by a person of ordinary skill in the art.

In some embodiments, tile software extension 114 may convert the content of the record into a meaningful image representation. For example, tile software extension 114 may convert a chart record to a portable network graphics (PNG) picture representation of the chart. As would be appreciated by a person of ordinary skill in the art, tile software extension 114 may be specific to a type of content of the record. Moreover, as would be appreciated by a person of ordinary skill in the art, tile software extension 114 may convert the content of the record using various mechanisms. Finally, as would be appreciated by a person of ordinary skill in the art, there may be multiple tile software extensions 114 for different types of records.

In some embodiments, tile software extension 114 may output the image representation of the record to host application 108. In some other embodiments, tile software extension 114 may store the image representation of the record on a software clipboard in client device 102. A user may later paste the image representation of the record into host application 108.

While FIG. 1 illustrates client device 102 connected to server platform 106 via network 106, a person of ordinary skill in the art would understand that secure authenticated connected keyboard system 100 may also be implemented entirely on client device 102. For example, in some embodiments, host application 108, connected keyboard 110, credential database 112, application 116, and record store 118 may be implemented together on client device 102. As would be appreciated by a person of ordinary skill in the art, host application 108, connected keyboard 110, credential database 112, application 116, and record store 118 may communicate directly with each other on client device 102. For example, host application 108, connected keyboard 110, credential database 112, application 116, and record store 118 may communicate with each other via an inter-process communication (IPC) mechanism of an operating system of client device 102.

Figure 2A:
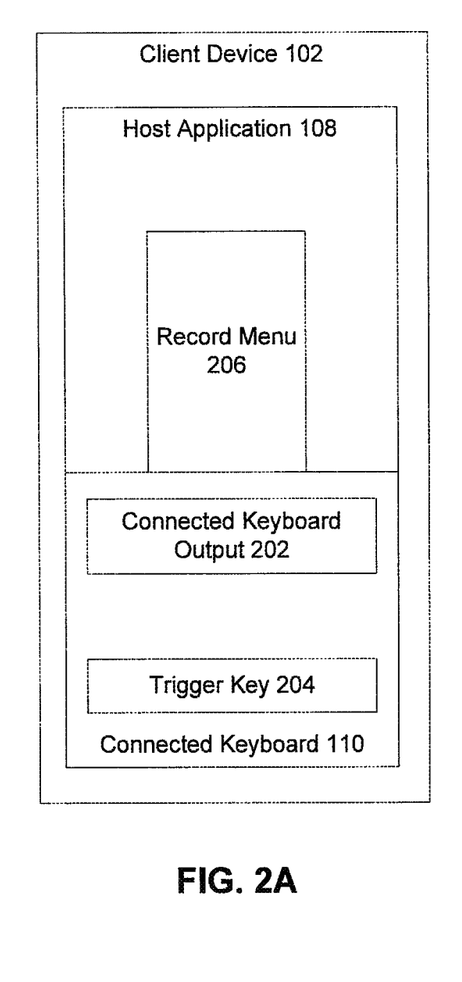
FIG. 2A illustrates an example of requesting a record from an application at a user interface of a connected keyboard for a host application, according to some embodiments.

FIG. 2A illustrates an example of requesting a record from application 116 at a user interface of connected keyboard 110 for host application 108, according to an example embodiment. FIG. 2A is discussed with respect to FIG. 1.

In FIG. 2A, client device 102 displays host application 108 (e.g., an email client) on a display screen. A user interface of connected keyboard 110 is displayed on the display screen when host application 108 is ready to receive user input. For example, the user interface of connected keyboard 110 may be displayed when a user inserts the cursor into an input text box in host application 108.

In some embodiments, the user interface of connected keyboard 110 may include a connected keyboard output 202 and a trigger key 204. Connected keyboard output 202 may display user input that is going to be sent to host application 108. For example, in some embodiments, a user may send user input in connected keyboard output 202 to host application 108 in response to a user tapping a key on connected keyboard 110.

In some embodiments, trigger key 204 may enable a user to request a record from application 116 via the user interface of connected keyboard 110 for host application 108. For example, trigger key 204 may be a space bar key on the user interface of connected keyboard 110 that is activated by pressing the space bar key for a predefined period of time (e.g., force touch press).

In some embodiments, in response to activating trigger key 204, the user interface of connected keyboard 110 may display record menu 206. In some embodiments, the user interface of connected keyboard 110 may display record menu 206 as an overlay menu on top of host application 108. A user may issue a search request or a request for a record in application 116 from record menu 206. In some embodiments, connected keyboard 110 may access credential database 112 in order to log in to application 116 and submit the search request or the request for the record to application 116.

Figure 2B:
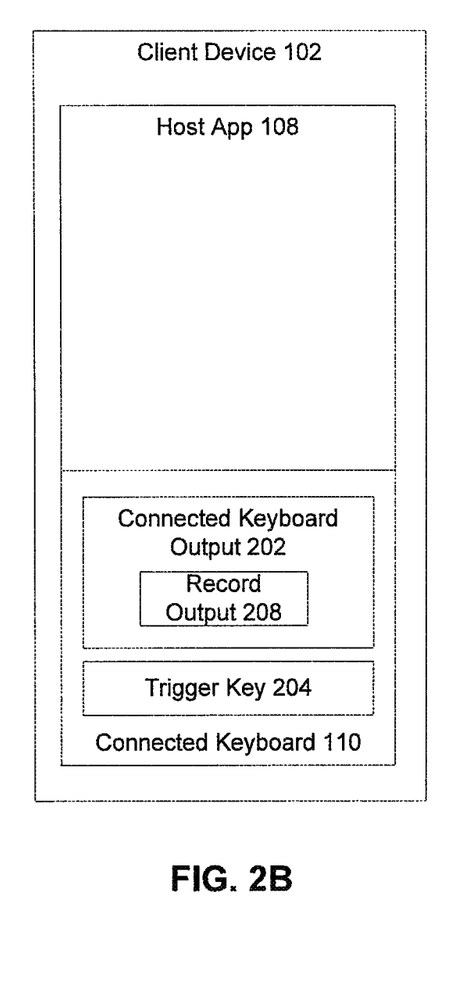
FIG. 2B illustrates an example of outputting a record from an application at a user interface of a connected keyboard for a host application, according to some embodiments.

FIG. 2B illustrates an example of outputting a record from application 116 at a user interface of a connected keyboard 110 for host application 108, according to an example embodiment. FIG. 2B illustrates outputting a record requested from application 116 as discussed with respect to FIG. 2A. FIG. 2B is discussed with respect to FIG. 1.

In FIG. 2B, client device 102 receives a requested record from application 116. In some embodiments, connected keyboard 110 may convert the received record into a text representation. In some embodiments, connected keyboard 110 may also generate a deep link to the record in application 116.

In some embodiments, connected keyboard 110 may output the record to connected keyboard output 202 as record output 208. Record output 208 may include the text representation of the record. Record output 208 may further include the deep link to the record in application 116.

In some embodiments, connected keyboard 110 may determine that there is a corresponding tile software extension 114 that can generate an image representation of the record. Based on this determination, connected keyboard 110 may send the record to tile software extension 114 in order to generate an image representation of the record. In some embodiments, in response to receiving the record from connected keyboard 110, tile software extension 114 may output an image representation of the record to a software clipboard of client device 102. In some other embodiments, tile software extension 114 may output an image representation of the record to connected keyboard output 202 as part of record output 208.

Figure 3:
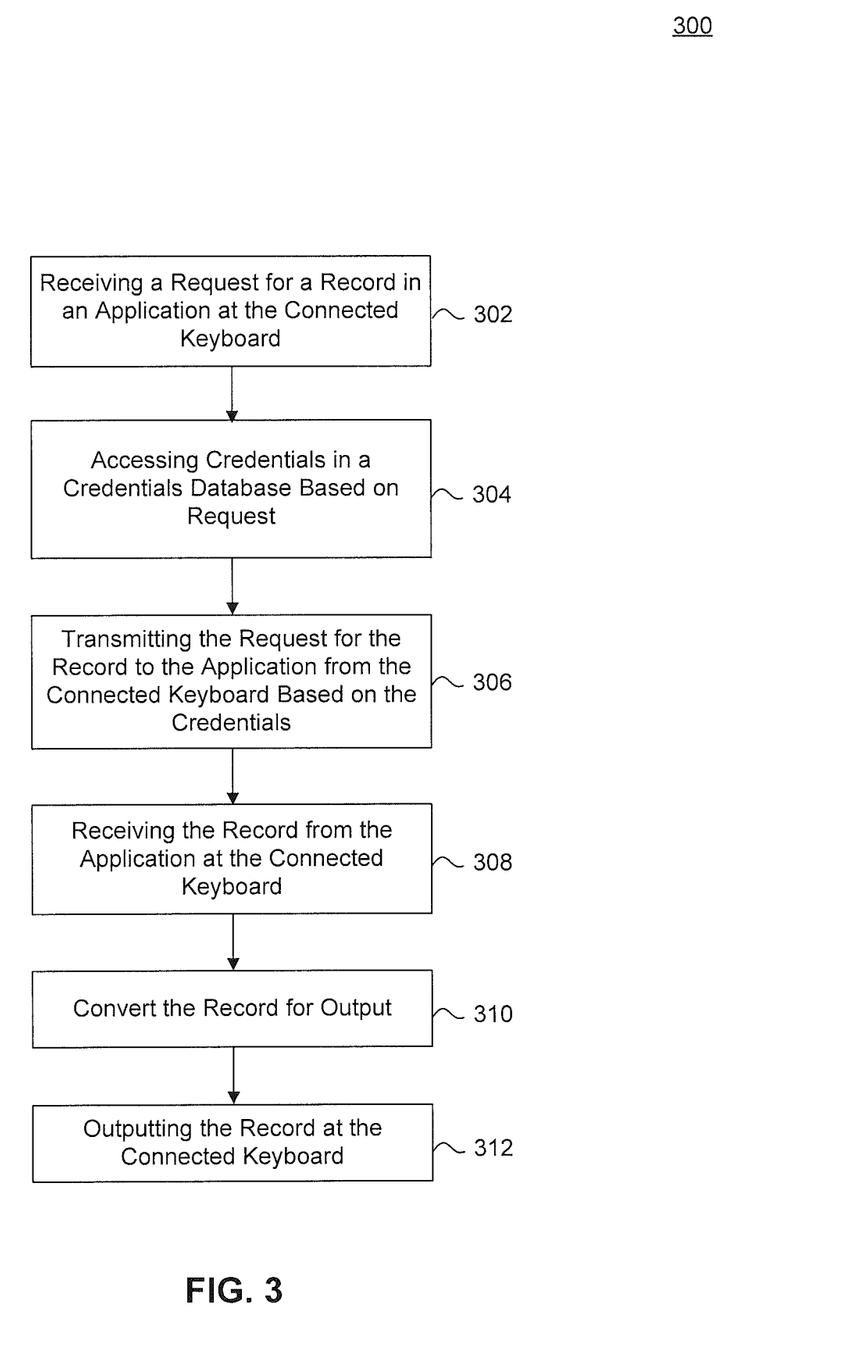
FIG. 3 is a flowchart illustrating a process for inserting a record from an application at a user interface of a connected keyboard for a host application, according to some embodiments.

FIG. 3 is a flowchart for a method 300 for inserting a record from an application at a user interface of a connected keyboard for a host application, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, connected keyboard 110 receives a request for a record in application 116 via a user interface of connected keyboard 110. In some embodiments, connected keyboard 110 may receive a request for the record based on a user gesture at the user interface of connected keyboard 110. In some embodiments, connected keyboard 110 may display a menu of commands to user interface of connected keyboard 110 in response to the user gesture. In some embodiments, connected keyboard 112 may display a menu of commands to the user interface of connected keyboard 110 based on a state of host application 108 or a user context. In some embodiments, connected keyboard 110 may generate the request for the record based on a user selection of the record from the menu of commands in the user interface of connected keyboard 110.

In 304, connected keyboard 110 accesses credentials in credential database 112 based on the request.

In 306, connected keyboard 110 transmits the request for the record to application 116 based on the credentials.

In 308, connected keyboard 110 receives the requested record from application 116.

In 310, connected keyboard 110 converts the record for output. In some embodiments, connected keyboard 110 may convert the record to a text representation for output. In some embodiments, connected keyboard 110 may generate a deep link to the record in application 116 for output. In some embodiments, connected keyboard 110 may generate a image representation of content of the record for output. In some embodiments, connected keyboard 110 may generate the image representation of the content of the record using tile extension 114.

In 312, connected keyboard 110 outputs the record to host application 108. In some embodiments, connected keyboard 110 may output one or more of the text representation of the record, the deep link to the record in application 116, and the image representation of the content of the record. In some embodiments, connected keyboard 110 may generate the image representation of the content of the record using tile extension 114. Connected keyboard 110 may output the record to host application 108 automatically or in response to a user input.

Figure 4:
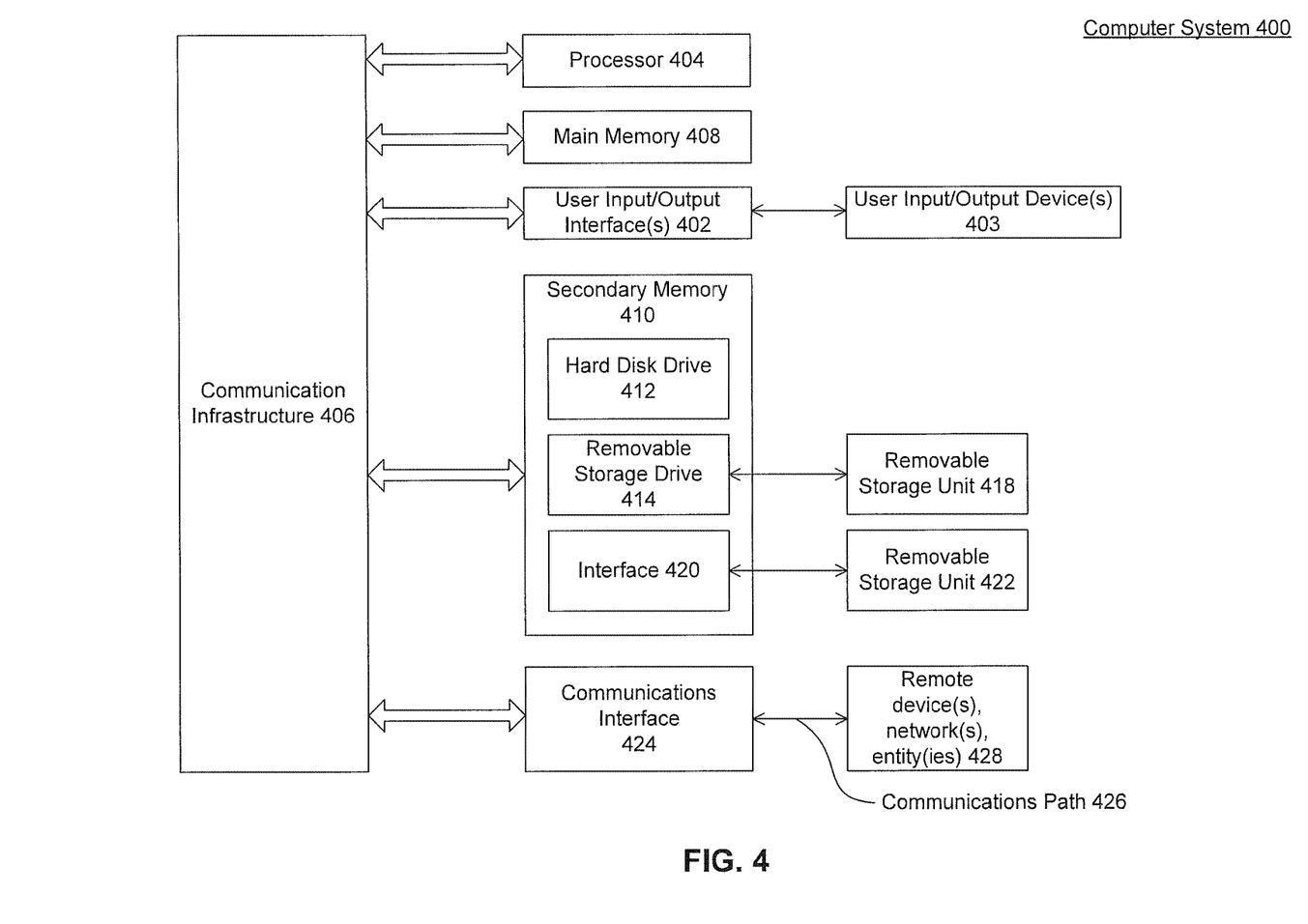
FIG. 4 is an example computer system useful for implementing various embodiments.

Various embodiments can be implemented, for example, using one or more computer systems, such as computer system 400 shown in FIG. 4. Computer system 400 can be used, for example, to implement method 300 of FIG. 3. For example, computer system 400 can perform requesting a record from application 116 at connected keyboard 110 for host application 108. Computer system 400 can further perform outputting a record from application 116 at connected keyboard 110 for host application 108, according to some embodiments. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
receiving, by at least one processor, a request for a record in a server application at a user interface of a connected keyboard displayed by a host application, the connected keyboard being displayed in a state for receiving user input;
accessing, by the at least one processor, credentials in a credential database from the connected keyboard based on the request for the record;
transmitting, by the at least one processor, the request for the record to the server application from the connected keyboard based on the credentials;
receiving, by the at least one processor, the record from the server application at the connected keyboard; and
outputting, by the at least one processor, the record from the connected keyboard at the host application.

2. The method of claim 1, the outputting further comprising:
outputting a text representation of the record and a deep link to the record in the server application from the connected keyboard.

3. The method of claim 1, further comprising:
logging in to the server application based on the credentials in the credential database.

4. The method of claim 1, wherein the receiving the record further comprises:
receiving the record in JavaScript Object Notation (JSON) or an Extensible Markup Language (XML) data format over a Hypertext Transfer Protocol (HTTP) connection or a HTTP Secure (HTTPS) connection.

5. The method of claim 1, further comprising:
receiving a user input, wherein the user input is based on a force touch press at the user interface of the connected keyboard;
outputting a menu of commands to the user interface of the connected keyboard in response to the receiving the user input;
generating a search request based on a search criteria and a user selection of a command in the menu of commands in the user interface of the connected keyboard;
receiving a list of records matching the search criteria, wherein the list of records comprises the record in the server application; and
receiving the request for the record based on a user selection of the record in the list of records in the user interface of the connected keyboard.

6. The method of claim 1, further comprising:
generating an image representation of the record using a tile software extension associated with the connected keyboard.

7. The method of claim 6, the outputting further comprising:
outputting the image representation of the record from the connected keyboard.

8. The method of claim 1, the receiving the request for the record further comprising:
receiving a user input, wherein the user input is based on a force touch press at the user interface of the connected keyboard;
outputting a menu of commands to the user interface of the connected keyboard in response to the receiving the user input; and
receiving the request for the record based on a user selection of a command in the menu of commands in the user interface of the connected keyboard.

9. The method of claim 8, further comprising:
outputting the menu of commands to the user interface of the connected keyboard based on a state of the host application associated with the connected keyboard and a user context.

10. A system, comprising:
a memory; and
at least one processor coupled to the memory and configured to:
receive a request for a record in a server application at a user interface of a connected keyboard displayed by a host application, the connected keyboard being displayed in a state for receiving user input;
access credentials in a credential database from the connected keyboard based on the request for the record;
transmit the request for the record to the server application from the connected keyboard based on the credentials;
receive the record from the server application at the connected keyboard; and
output the record from the connected keyboard at the host application.

11. The system of claim 10, wherein to output the at least one processor is further configured to:
output a text representation of the record and a deep link to the record in the server application from the connected keyboard.

12. The system of claim 10, the at least one processor further configured to:
log in to the server application based on the credentials in the credential database.

13. The system of claim 10, wherein to receive the record the at least one processor is further configured to:
receive the record in JavaScript Object Notation (JSON) or an Extensible Markup Language (XML) data format over a Hypertext Transfer Protocol (HTTP) connection or a HTTP Secure (HTTPS) connection.

14. The system of claim 10, the at least one processor further configured to:
receive a user input, wherein the user gesture is based on a force touch press at the user interface of the connected keyboard;
output a menu of commands to the user interface of the connected keyboard in response to the receiving the user input; and
receive the request for the record based on a user selection of a command in the menu of commands in the user interface of the connected keyboard.

15. The system of claim 10, the at least one processor further configured to:
generate an image representation of the record using a tile software extension associated with the connected keyboard.

16. The system of claim 15, wherein to output the at least one processor is further configured to:

output the image representation of the record from the connected keyboard.

17. A non-transitory computer-readable device having instructions stored thereon that, when executed by at least one computing device, causes the at least one computing device to perform operations comprising:

receiving a request for a record in a server application at a user interface of a connected keyboard displayed by a host application, the connected keyboard being displayed in a state for receiving user input;

accessing credentials in a credential database from the connected keyboard based on the request for the record;

transmitting the request for the record to the server application from the connected keyboard based on the credentials;

receiving the record from the server application at the connected keyboard; and outputting the record from the connected keyboard at the host application.

18. The non-transitory computer-readable device of claim 17, the outputting comprising:

outputting a text representation of the record and a deep link to the record in the server application from the connected keyboard.

19. The non-transitory computer-readable device of claim 17, the operations further comprising:

generating an image representation of the record using a tile software extension associated with the connected keyboard.

20. The non-transitory computer-readable device of claim 17, the operations further comprising:

receiving a user input, wherein the user input is based on a force touch press at a user interface of the connected keyboard;

outputting a menu of commands to the user interface of the connected keyboard in response to the receiving the user input; and receiving the request for the record based on a user selection of a command in the menu of commands in the user interface of the connected keyboard.

21. The method of claim 1, further comprising:

maintaining a state of the host application during the receiving.

\* \* \* \* \*